Figure 1:
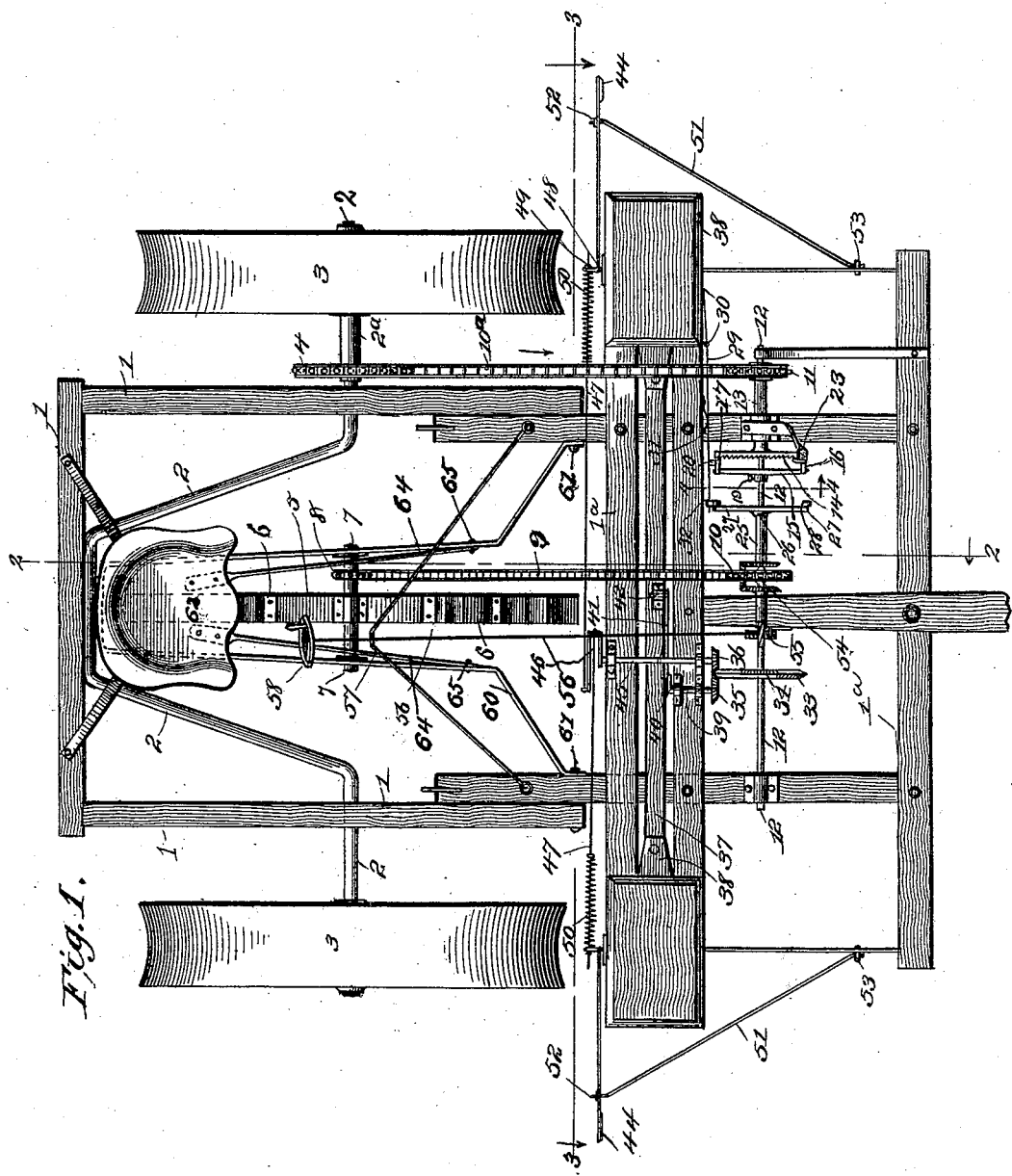

(No Model.)  4 Sheets—Sheet 1.

J., W. C. & G. A. THODE.
H. F. Thode, Administrator of W. C. Thode, Deceased.
CHECK ROW CORN PLANTER.

No. 515,265.  Patented Feb. 20, 1894.

Witnesses  
Harry D. Rohrer  
Walter E. Allen

Inventors  
Joachim Thode.  
William C. Thode.  
Gustav A. Thode.  
By Knight Bros. Attorneys (No Model.) 4 Sheets—Sheet 2.
J., W. C. & G. A. THODE.
H. F. THODE, Administrator of W. C. THODE, Deceased.
CHECK ROW CORN PLANTER.
No. 515,265. Patented Feb. 20, 1894.
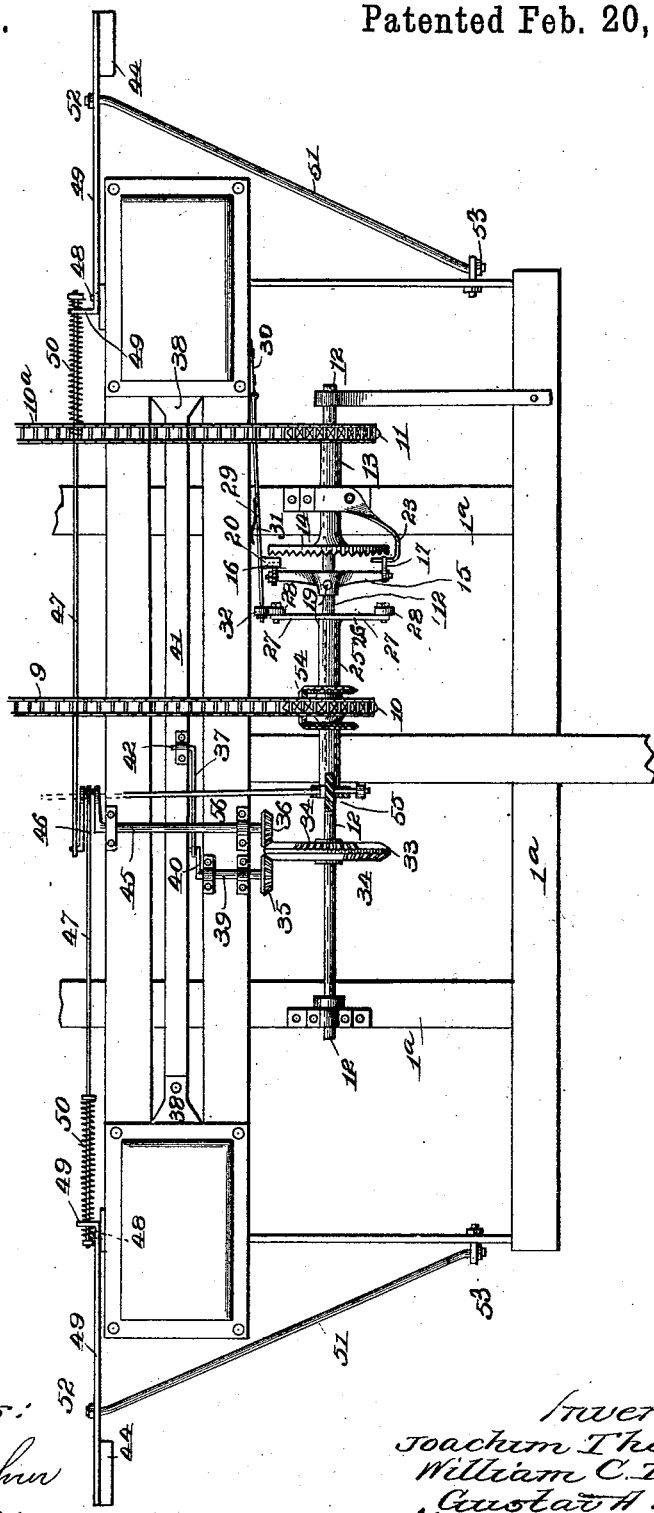
Witnesses:
Harry D. Rohun
Walter Allen
Inventors:
Joachim Thode,
William C. Thode,
Gustav A. Thode.
By Knight Bros. Attys.

(No Model.) 4 Sheets—Sheet 3.
J., W. C. & G. A. THODE.
H. F. THODE, Administrator of W. C. THODE, Deceased.
CHECK ROW CORN PLANTER.
No. 515,265. Patented Feb. 20, 1894.
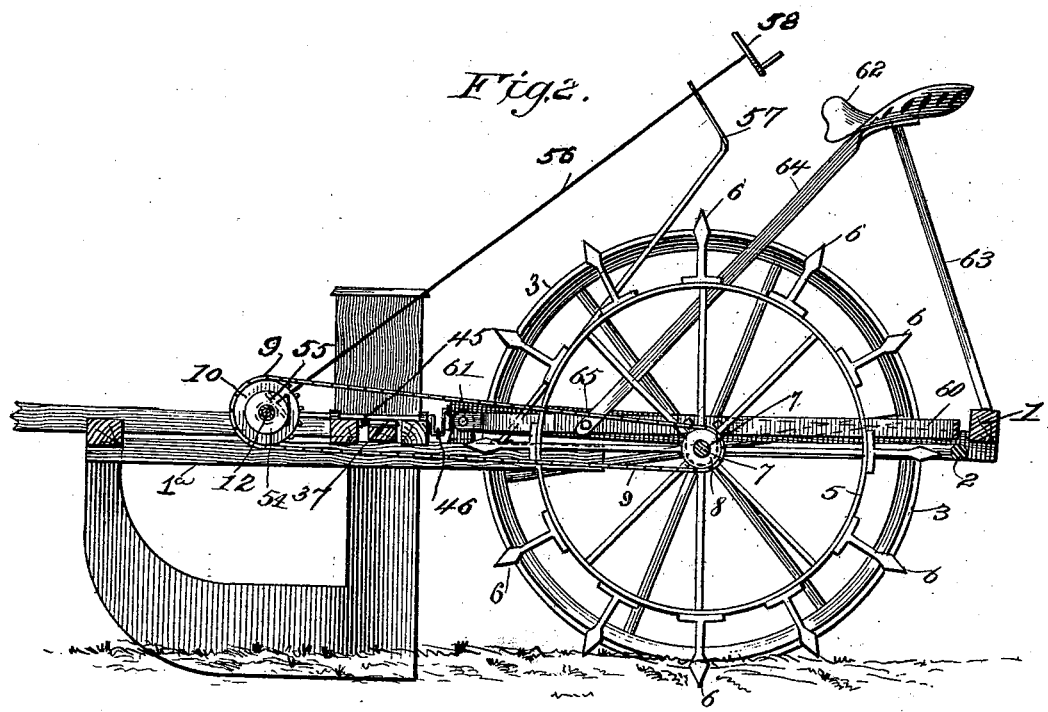
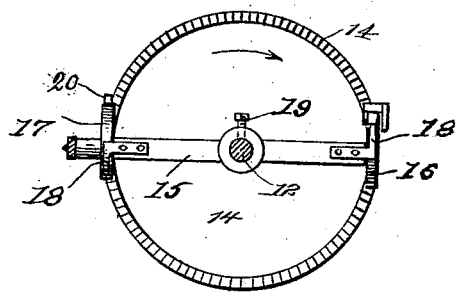
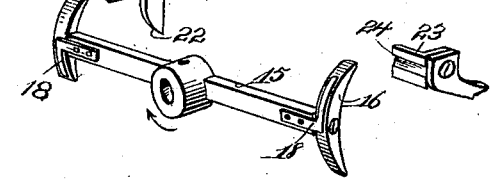
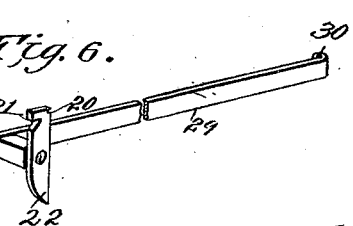
Witnesses:
Harry T. Rohrer
Walter E. Allen
Inventors:
Joachim Thode
William C. Thode
Gustav A. Thode
By Knight Bros
Attorneys.
THE NATIONAL LITHOGRAPHING COMPANY,
WASHINGTON, D. C.

(No Model.) 4 Sheets—Sheet 4.
J., W. C. & G. A. THODE.
H. F. Thode, Administrator of W. C. Thode, Deceased.
CHECK ROW CORN PLANTER.
No. 515,265. Patented Feb. 20, 1894.
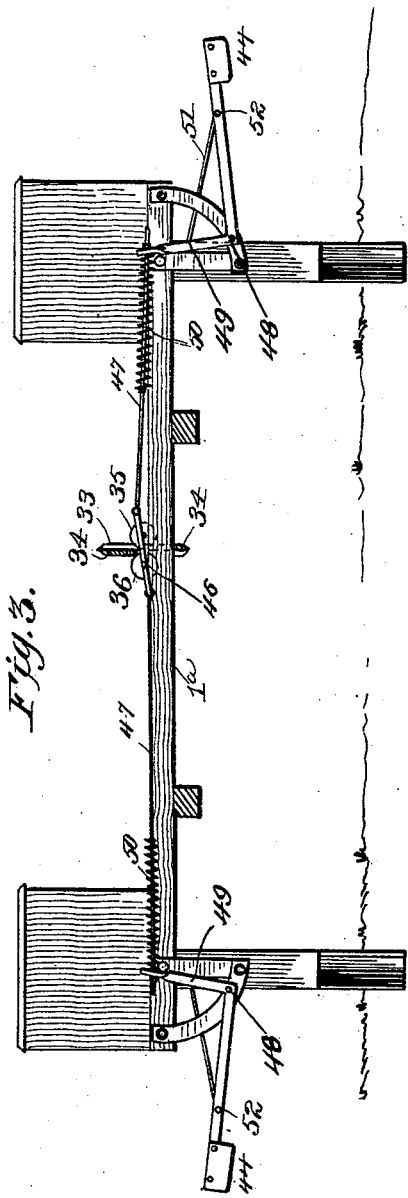
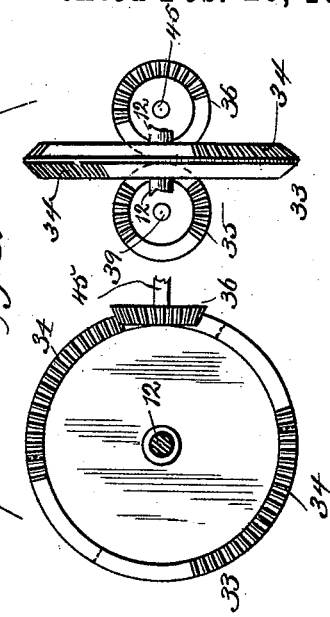
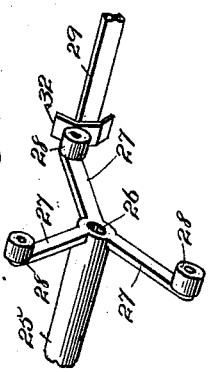
Witnesses:
Harry D. Rohrer.
Walter E. Allen.
Inventors:
Joachim Thode,
William C. Thode,
Gustav A. Thode,
By Knight Bros
Attorneys

UNITED STATES PATENT OFFICE.

JOACHIM THODE AND WILLIAM C. THODE, OF HOLSTEIN, IOWA, AND GUSTAV A. THODE, OF OSMOND, NEBRASKA; HENRY F. THODE ADMINISTRATOR OF WILLIAM C. THODE, DECEASED.

CHECK-ROW CORN-PLANTER.

SPECIFICATION forming part of Letters Patent No. 515,265, dated February 20, 1894.

Application filed January 13, 1893. Serial No. 458,274. (No model.)

*To all whom it may concern:*

Be it known that we, JOACHIM THODE and WILLIAM C. THODE, of Holstein, county of Ida, State of Iowa, and GUSTAV A. THODE, formerly of Holstein, aforesaid, but now of Osmond, county of Pierce, State of Nebraska, citizens of the United States, have invented certain new and useful Improvements in Check-Row Corn-Planters, of which the following is a full, clear, and exact description.

The present invention relates to corn planters of the same general construction as that described in United States Patent No. 405,444, granted June 18, 1889, to Gustav A. Thode, and consists in certain features of novelty to be hereinafter fully described and particularly pointed out in the claims whereby an unchanging regularity of planting in variable conditions of soil, is insured.

In carrying out the present invention, we employ, in connection with the planter substantially as heretofore constructed, a central spoke-wheel which runs parallel with the main wheels and which, while not depended upon for the power to operate the marking and dropping mechanism, is employed to connect and disconnect through the medium of a clutch mechanism the driving connections from one of the main wheels, with the said marking and dropping mechanism. This spoke-wheel is located centrally on the machine and forms an accurate measuring device for the lineal distance traveled by the machine, and inasmuch as the marking and dropping are regulated solely by this spoke wheel, these operations are not affected by irregularities over which the outer main wheels travel.

In the accompanying drawings:—Figure 1 is a plan view of a corn-planter to which the present invention is applied. Fig. 1ª is a plan view of the runner frame part of the machine. Fig. 2 is a vertical longitudinal section of the machine on the line 2—2 Fig. 1. Fig. 3 shows, in rear elevation, the marking and dropping devices. Fig. 4 shows a face view of a constantly rotating ratchet wheel and a pair of co-operating pawls which are intermittently rendered active by engagement therewith of the said ratchet-wheel. Fig. 5 is a detail perspective view of said co-operating pawls, the trip which effects their release on one side after they have completed one revolution, and the detent which holds them out of engagement with the ratchet-wheel on the other side until they are again to become active. Fig. 6 is a perspective view of the disengaging detent together with its controlling lever. Fig. 7 is a perspective view of a rotating spider, the arms of which engage the end of the detent-lever at regularly recurring intervals and effect the disengagement of the detent from the double pawl, to set the dropping and marking devices in motion. Fig. 8 represents in side elevation and edge view a two-faced bevel gear having series of teeth, and showing its relation to the mutilated small gear which it actuates at intervals to set into operation the markers and the droppers.

1 represents the main or wheel frame and 1ª the runner frame of the machine, 2 the main axle, 3 the ground wheels and 4 a sprocket-wheel which is caused to rotate with one of the ground wheels and transmits power for running the machine.

5 represents a central spoke-wheel, having radially arranged peripheral spokes 6. This spoke-wheel is mounted upon an axle 7 and has a gear-wheel 8 fixed to its axle, so as to rotate therewith, and from the gear-wheel 8 motion is communicated through a chain-belt 9 to a wheel 10, which is arranged to drive suitable clutch operating mechanism which is interposed between the check-marker and dropper and the power wheel as will be hereinafter described.

10ª is a chain which communicates power from the sprocket-wheel 4 on the hub 2ª of the wheel on the main axle, to a sprocket-wheel 11 on a transverse shaft 12 which runs across the runner wheel frame of the machine. The sprocket-wheel 11 is not fixed to the shaft 12 but is secured to a sleeve 13 which is adapted to turn on said shaft and which carries at its other end the ratchet-wheel 14.

Fixed on the shaft 12, in front of the ratchet-wheel 14, is a transverse yoke 15 having pivoted at its opposite ends, pawls 16, 17. Each pawl has its rear end presented toward the face of the ratchet-wheel and is held with yielding pressure in position for engagement therewith, by means of springs 18, attached to the yoke 15, and having their outer ends bent at right angles against the pawls. 19 represents a set screw for fixing the yoke 15 on the shaft 12, to cause them to turn together. The pawls 16, 17, being fixed relatively to the shaft 12 through their yoke 15, it is obvious that when the pawls are in engagement with the ratchet-wheel 14, the motion received by said ratchet-wheel through the sleeve 13, sprocket wheel 11, and chain 10 from the wheel 4, will be imparted, through the yoke 15, to the shaft 12. The rear ends of the pawls are permitted to drop into engagement with the ratchet wheel, make a half revolution and are then disengaged, so that the shaft 12 receives a series of intermittent movements of one half revolution each from the hub 2ª of the wheel on the main axle and this engagement or disengagement of the pawl is effected at regularly recurring intervals by the following mechanism:—20 represents a detent having a notch 21 and a lower cam end 22, and 23 represents a trip having a notch 24. When the yoke 15 moving in the direction of the arrow Fig. 4 completes a half revolution, the pawls 16, 17 are engaged by the detent 20 and trip 23 respectively and forced out of engagement with the ratchet wheel 14 and one of their ends engages in the notches 21 and 24 respectively and suddenly checks the shaft 12 and locks it against further rotation in either direction. In order to cause the re-engagement of the pawls with the ratchet wheel, it is simply necessary to withdraw the detent 20 from beneath that pawl which is at the time being resting upon it whereupon the lower end of said pawl will fall against one of the teeth on the ratchet-wheel 14. The yoke will immediately be set in operation and the pawl on the opposite end which rests upon the trip 23 will be dragged off of said trip and the yoke will rotate with the ratchet-wheel until that pawl which has just left the trip rides up on to the detent 20 and engages in notch 21. The motion of the yoke will then be interrupted and the pawl which has now arrived at the trip 23 with its forward end elevated will have admitted said trip beneath its elevated end so that the rear end which is in engagement with the ratchet-wheel will ride upon the trip until said rear end snaps into the notch 24 and thus locks the yoke against any tendency to retrograde movement. It will be understood that this engagement of the two pawls in the notches 21 and 24 occurs simultaneously.

In order to move the detent 20 out of engagement with the pawl which rests upon it at any time, it is mounted upon a spring-pressed lever 29 which keeps it normally in position for engagement, and is temporarily withdrawn at regularly recurring intervals by the following mechanism:—25 represents a sleeve mounted loosely upon the common shaft 12 and having working connection with the sprocket-wheel 10, hereinbefore referred to, which receives motion through chain-belt 9 and sprocket-wheel 8 from the axle 7 of spoke-wheel 5. Upon this sleeve 25 is mounted a spider 26 having a suitable number of symmetrically arranged radial arms 27 (we have shown three) on the end of each of which arms is mounted an anti-friction-roller 28. The construction of this spider is shown more clearly in Fig. 7, while its relation to the other parts of the mechanism will be understood upon reference to Fig. 1. 29 represents the spring-pressed lever which carries the detent 20 hereinbefore referred to, and this lever is attached in any suitable manner at 30 to the machine and has spring 31 which forces it outward in such a way as to keep the detent 20 normally in position for engagement with one of the pawls on the yoke 15. At its outer or free end the lever 29 is provided with a cam-plate 32 which lies normally in the path of and intercepts the anti-friction rollers 28 on the arms 27 of the spider 26 when said spider rotates, and the cam is so adjusted that when one of said rollers is forced past said cam, the lever 29 will be deflected, in opposition to its spring 31, a sufficient distance to withdraw the detent 20 from beneath the pawl which rests upon it. The rear end of pawl then immediately snaps into the ratchet-wheel 14 and causes motion to the extent of one half revolution to be imparted from said ratchet-wheel to the common shaft 12 as heretofore more fully described. The common shaft 12, while serving as bearing for the sleeves 13 and 25, also has fixed to it the gear-wheel which imparts motion to the check-markers and dropper-valves. From the foregoing it will be observed that each time one of the spider arms engages the cam-plate 32, through the medium of the anti-friction-roller 28, the clutch between the driving mechanism or power-wheel and the check-markers and droppers is thrown into engagement for a half revolution of said clutch. This half revolution while the parts of the clutch are in engagement, and of the main shaft 12 is imparted to the check-markers and droppers to effect a single stroke of each through the following mechanism:

Near its opposite end on the shaft 12 is fixed a double bevel mutilated gear-wheel 33, on the faces of which are formed interrupted series of teeth 34, each covering about one fourth the circumference and spaced apart by similar distances. This gear-wheel 33, engages two bevel pinions 35, 36, connected respectively with the dropper-valves and check-markers. The bevel-pinion 35 has two series of teeth and two smooth spaces with which the bevel gear-wheel 33 engages and these cause a rotation of one half revolution of the bevel-pinion 35, for each half revolution of the bevel gear-wheel 33, and this imparts a single impulse to the connecting rod 37, of the dropper-valves 38, alternately in opposite directions, through the medium of shaft 39, crank 40, and pitman 41 which is journaled on the connecting rod 37 at 42. The bevel pinion 36 is provided with only one smooth and one toothed portion and this wheel makes a full revolution to each half revolution of bevel gear wheel 33. This full revolution serves to make a complete down and up stroke of the check-markers 44 through the medium of shaft 45, double-crank 46 and pitman 47. The check-markers 44 are pivoted at 48 and have right angle extensions 49 with which the pitmen 47 communicate. In order to force the check-markers down with a yielding force, and thus avoid injury to the parts in the event of meeting with obstructions, the thrust from the pitmen 47 is imparted to the short arms 49, of the check-markers, through the medium of compression springs 50.

51 represent guy-rods connected at 52 and 53 with the check-markers and a fixed part of the runner frame, respectively, and these guy-rods 51, while serving to securely brace the check-markers against transverse strains, offer no obstruction to a free vertical vibration of the same.

For the purpose of throwing the clutch operating mechanism into and out of active relation with its co-operating parts, we employ a shifting gear 54 controlled by a worm and worm-wheel 55 and a shaft 56, which is journaled in a frame 57 and carries at its upper end within convenient reach of the driver a hand-wheel 58. These parts may be of any suitable construction for the purpose of throwing the wheel 10 or its bevel-gear, into or out of operative relation with the bevel-gear on the spider sleeve. We have shown these parts constructed in a manner similar to corresponding parts used for connecting and disconnecting the power with the planting and marking mechanism, in the patent hereinbefore referred to and they need not therefore be more specifically described.

In order to avoid any lost motion of the spoke-wheel 5, by failure of its spokes to penetrate the ground, said spoke-wheel is mounted in a frame 60, pivoted at 61 at its forward end, to any suitable adjacent part of the runner-frame, and the seat 62 though supported mainly on the main-frame by a brace 63, is also provided with a brace 64, pivoted at 65, to the spoke-wheel frame 60, so that a portion of the weight of the driver constantly rests upon said spoke-wheel frame.

Having thus described our invention, what we claim is—

1. The combination, with a wheel frame, and a runner frame carrying the dropping mechanism; of an operating shaft mounted on the runner frame, gearing connecting the shaft with the dropping mechanism, a clutch-mechanism having one member mounted loosely on the shaft and the other member fixed to the shaft, gearing connecting the loose member of the clutch mechanism with the power wheel, setting device for connecting and disconnecting the members of the clutch-mechanism, a spoke-wheel, and gearing connecting the setting device with the spoke-wheel; substantially as described.

2. The combination, with a wheel frame, and a runner frame carrying the dropping mechanism; of an operating shaft mounted on the runner frame, gearing connecting the shaft with the dropping mechanism, a clutch mechanism having one member mounted loosely on the shaft, and the other member fixed to the shaft, gearing connecting the loose member of the clutch mechanism with the power wheel, means for connecting and disconnecting the members of the clutch mechanism, a spider, loosely mounted on the shaft, having radial arms for engaging said means, a spoke wheel, and gearing connecting the spider with the spoke wheel, substantially as described.

3. The combination, with a wheel frame, and a runner frame carrying the dropping mechanism; of an operating shaft mounted on the runner frame, gearing connecting the shaft with the dropping mechanism, a clutch mechanism having one member mounted loosely on the shaft, and the other member fixed to the shaft, gearing connecting the loose member of the clutch-mechanism with the power wheel, a lever having means for disconnecting the members of the clutch-mechanism, a spider loosely mounted on the shaft, having radial arms for operating the lever, a spoke wheel, and gearing connecting the spider with the spoke-wheel, substantially as described.

4. The combination, with a wheel frame and a runner frame carrying the dropping mechanism; of an operating shaft mounted on the runner frame, gearing connecting the shaft with the dropping mechanism, a clutch-mechanism having one member mounted loosely on the shaft, and the other member fixed to the shaft, gearing connecting the loose member of the clutch-mechanism with the power wheel, setting device for connecting and disconnecting the members of the clutch-mechanism, a spoke-wheel, gearing connecting the setting device with the spoke-wheel, a pivoted frame in which the spoke-wheel is mounted, and the seat having a support connected with the pivoted frame, substantially as described.

5. The combination, with a wheel frame, and a runner frame carrying the dropping mechanism; of an operating shaft mounted on the runner frame, gearing connecting the shaft with the dropping mechanism, a ratchet-wheel mounted loosely on the shaft, gearing connecting the ratchet-wheel with the power-wheel, a yoke fixed to the shaft carrying a pawl engaged by the ratchet-wheel, a lever having a detent formed with a cam face onto which the pawl rides for disconnecting the latter from the former, a spoke wheel, and connections between the lever and the spoke wheel, substantially as described.

6. The combination, with the wheel frame, and a runner frame carrying the dropping mechanism; of an operating shaft mounted on the runner frame, gearing connecting the shaft with the dropping mechanism, a ratchet-wheel mounted loosely on the shaft, gearing connecting the ratchet-wheel with the power wheel, a yoke fixed to the shaft carrying pawls engaged by the ratchet-wheel, a lever, located on one side of the ratchet-wheel, having a detent formed with a cam face onto which one of the pawls rides for disconnecting the latter from the former, a trip located on the opposite side of the ratchet wheel for simultaneously tripping the other pawl, a spoke-wheel, and connections between the lever and the spoke-wheel, substantially as described.

7. The combination, with a wheel frame and a runner frame, carrying the dropping mechanism; of an operating shaft mounted on the runner frame; gearing connecting the shaft with the dropping mechanism having one member mounted loosely on the shaft and the other member fixed to the shaft, gearing connecting the loose member of the clutch-mechanism with the power-wheel, a lever controlling the clutch mechanism, a spider, loosely mounted on the shaft, having radial arms for operating the lever, a gear wheel mounted on the spider, a spoke wheel, and connections between the gear wheel and the spoke-wheel; substantially as described.

8. The combination, with a wheel frame and a runner frame carrying the dropping mechanism; of an operating shaft mounted on the runner frame, a mutilated bevel gear wheel fixed on the shaft, a counter-shaft having a bevel gear wheel meshing with the mutilated bevel gear wheel, and a crank connected with the seed-slide, a clutch mechanism having one member mounted loosely on the shaft, and the other member fixed to the shaft, gearing connecting the loose member of the clutch-mechanism with the power wheel, setting device for connecting and disconnecting the members of the clutch mechanism, a spoke-wheel, and gearing connecting the setting device with the spoke-wheel; substantially as described.

9. The combination, with the wheel frame and a runner-frame, carrying the markers, of an operating shaft mounted on the runner frame, a mutilated bevel gear wheel fixed on the shaft, a counter-shaft having a bevel gear wheel meshing with the mutilated bevel gear wheel, and a double crank connected with the markers, a clutch mechanism having one member mounted loosely on the shaft and the other member fixed to the shaft, gearing connecting the loose member of the clutch mechanism with the power wheel, setting device for connecting and disconnecting the members of the clutch mechanism, a spoke-wheel, and gearing connecting the setting device with the spoke wheel substantially as described.

10. The combination, with a wheel-frame and a runner frame carrying the dropping mechanism and the markers; of an operating shaft mounted on the runner frame, a mutilated double bevel gear wheel fixed on the shaft, a counter-shaft having a bevel gear wheel meshing with one bevel gear of the double bevel gear wheel, and a crank connected with the seed-slide, a counter-shaft having a bevel gear wheel meshing with the other bevel gear of the double bevel gear wheel, and a double crank connected with the markers, a clutch mechanism having one member mounted loosely on the shaft and the other member fixed to the shaft, gearing connecting the loose member of the clutch mechanism with the power wheel, setting device for connecting and disconnecting the members of the clutch-mechanism, a spoke-wheel, and gearing connecting the setting device with the spoke-wheel; substantially as described.

JOACHIM THODE.
WILLIAM C. THODE.
GUSTAV A. THODE.

Witnesses to Joachim Thode:
J. WOHLENBERG,
ROBERT P. WHEATLEY.
Witnesses to William C. Thode:
CASTO VOSS,
ROBERT P. WHEATLEY.
Witnesses to Gustav A. Thode:
T. R. BECK,
D. W. WOOD.